April 6, 1954

J. BAILEY ET AL 2,674,006

PARALLEL MOLD BLOWING MACHINE

Filed July 9, 1952

INVENTORS
JAMES BAILEY
HERBERT A. PRATT
BY Bates + Willard
ATTORNEYS

April 6, 1954    J. BAILEY ET AL    2,674,006
PARALLEL MOLD BLOWING MACHINE
Filed July 9, 1952    2 Sheets-Sheet 2

INVENTORS
JAMES BAILEY
HERBERT A. PRATT
BY Bates + Willard
ATTORNEYS

Patented Apr. 6, 1954

2,674,006

UNITED STATES PATENT OFFICE 2,674,006

PARALLEL MOLD BLOWING MACHINE

James Bailey, West Hartford, and Herbert A. Pratt, Hartford, Conn., assignors to Plax Corporation, West Hartford, Conn., a corporation of Delaware Application July 9, 1952, Serial No. 297,894

2 Claims. (Cl. 18—5)

This invention relates to machines for extruding and blow-molding organic thermoplastic materials, hereinafter referred to as plastics, and has for its general object the provision of improvements in machines of this type by means of which blown plastic articles may be produced more efficiently.

Generally, machines embodying the invention operate to plasticize the plastic under heat and substantial working pressure of the order of 1000 to 10,000 p. s. i. A preselected or controlled amount of the plastic material is extruded through a shaping die or nozzle under pressures of the order of 100 to 1000 p. s. i. in the form of a tube into one or more molds where it is blow-molded into one or more bottles, or other blown articles. The plasticizing, extruding and blow-molding operations are integrated in a unitary process. Rigidification of the plastic by cooling, or otherwise, is not effected until the articles are fully expanded and shaped.

Heretofore, machines of this type have been provided with a single extrusion nozzle from which is extruded a single plastic tube, lengths of which are successively blow-molded into bottles or the like.

The present invention provides a machine having a single plasticizing chamber which feeds a plurality of extrusion nozzles from which are extruded plastic tubes, lengths of which preferably are concurrently blow molded.

Machines embodying the invention have substantially greater production capacity and efficiency than the single tube machines of the prior art.

Other advantages of the invention will be pointed out or will be apparent from the following description, having reference to the accompanying drawings, in which.

Figure 1:
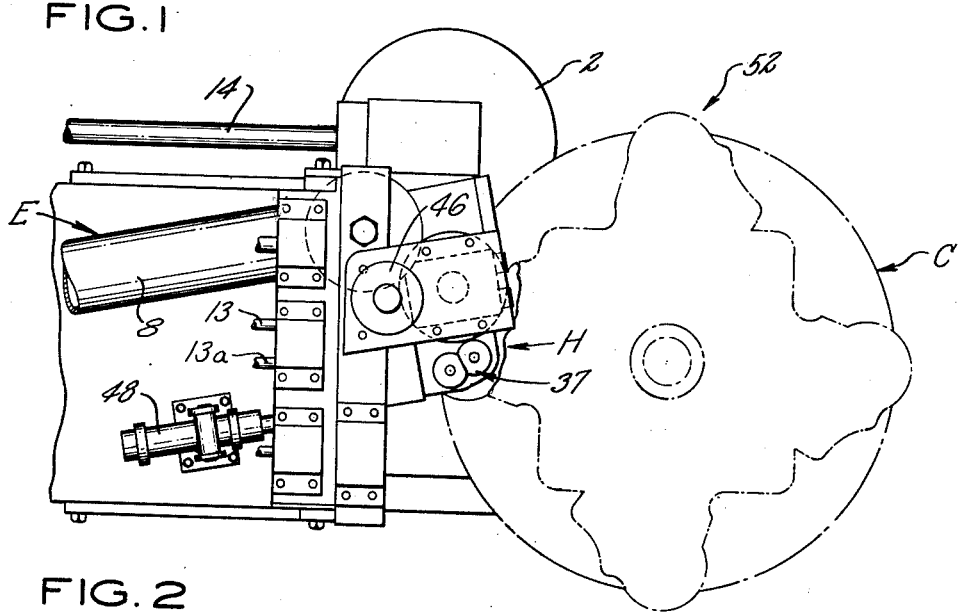
Figure 1 is a fragmentary plan view of plasticizing, extruding and blow molding apparatus embodying the invention.

Generally, the illustrated embodiment of the invention comprises an extruder, a portion of which is shown at E, (Figs. 1-2) having a head, generally designated H, for shaping and delivering a pair of plastic tubes $T^1$ and $T^2$ (Fig. 3) to successive pairs of mold cavities $M^1$, $M^2$, respectively, of a mold M the split sections of which are operably mounted on a rotary mold carrier generally designated C. The mold carrier C is rotated step by step by a motor 2 through a Geneva drive, or other suitable mechanism (not shown) to successively locate like pairs of mold cavities $M^1$, $M^2$, in alignment with their respective tube extruding nozzles $N^1$, $N^2$.

The extruder E comprises an elongate barrel 8, the rear end portion of which may be pivotally or otherwise mounted (not shown) to provide for up and down movement of the extruder head H which is secured to the forward end of the extruder barrel 8. This movement may be effected in any suitable manner as, for example, by a fluid motor 9, the piston rod 10 of which is connected by a connecting rod 11 to a bracket 12 fastened to the extruder barrel 8. The motor 9 is operated to raise the extruder head H by air or other hydraulic pressure medium supplied through a line 13 from a valve (not shown) the operation of which is synchronized with the rotation of the mold carrier C by a timer shaft 14 geared to the motor 2 which rotates the carrier C. Downward movement of the head H, when the pressure in line 13 is relieved, is effected by air supplied to the motor 9 through a line 13a and may be cushioned by a compression spring (not shown) or by controlled bleeding of pressure medium from the cylinder of the motor 9 through the line 13, or by other suitable cushioning means.

The extrusion head H receives plastic which has been heated and worked to the desired condition of plasticity as a result of its passage through the extruder cylinder 8 and periodically discharges measured amounts of the softened plastic in tubular form from the extrustion nozzles $N^1$ and $N^2$.

Figure 4:
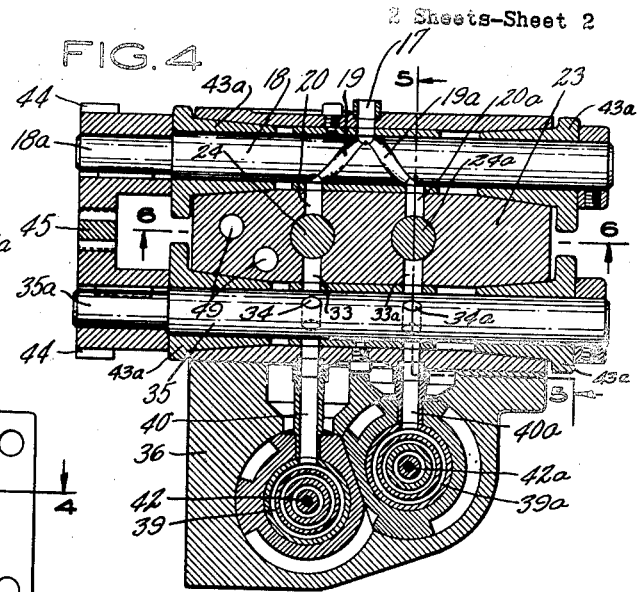
Fig. 4 is a cross-sectional view taken on line 4—4 of Fig. 3.

More particularly as shown in Fig. 4, the plasticated thermoplastic material is supplied from the extruder cylinder 8 through a passage 17 into a valve 18 which divides and directs portions of the plastic flow through valve passages 19, 19a and inlet passages 20, 20a, respectively, into a pair of cylindrical measuring chambers 22, 22a (Fig. 6) in a block 23, which is a component of the head H. The plastic is swept and discharged from the chambers 22 and 22a by pistons 24 and 24a, respectively, which are maintained under pressure by a hydraulic motor 25 to the piston rod 26 of which they are secured by a crosshead 26a. Oil or other pressure medium for operating the motor 25 to depress the pistons 24 and 24a and thereby force a measured charge of plastic material from each of the cylinders 22 and 22a is supplied by a high pressure line 27 from a suitable source (not shown).

Figure 6:
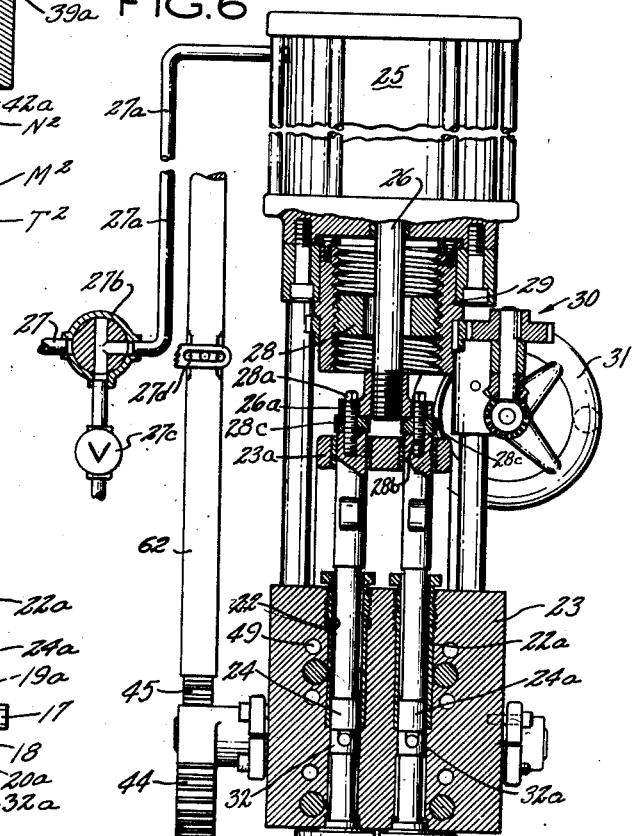
Fig. 6 is a cross-sectional view on a reduced scale taken generally on line 6—6 of Fig. 4, of the charge-measuring and feeding portion of the apparatus.

In the preferred embodiment of the invention, pressure is continually maintained in line 27. However, it also is preferable that the pressure on the motor 25 be reduced during the charging of the chamber 22 with plastic so that the extruder cylinder 8 is not working against excessive back pressure. Accordingly, the line 27 may be connected with a line 27a to the motor 25 by a three-way valve 27b when a vertically reciprocal shaft 62 is in its upper position. Movement of the shaft 62 to a lower position shown in Fig. 6 operates the valve 27b by means of valve lever 27d to close the high pressure line 27 and to connect the line 27a with a low pressure check or safety valve 27c which keeps the plastic entering the chambers 22 and 22a from the extruder cylinder 8 through the valve 18 under uniform back pressure until the pistons 24 and 24a reach the uppermost positions permitted by engagement with an externally threaded traveling collar stop 28. As shown in Fig. 6, the elevation of the non-rotatable collar 28 is readily adjusted by an internally threaded sleeve 29 which is rotated to raise or lower the collar 28 by means of suitable gearing, generally designated 30, operated by a hand wheel.

In accordance with the present invention, the quantity of plastic discharged by the downstroke of the pistons 24 and 24a may be individually adjusted. In the illustrative embodiment, as shown in Fig. 6, the upper portions of the pistons 24, 24a are slidably supported in a bracket 23a secured to the block 23 and are provided at their upper ends with adjustable stop bolts 28a, 28b and lock nuts 28c which are adjustable so that the bolts 28a, 28b engage the stop 28 and limit the upper position of the pistons 24, 24a to which they are forced by entrance of selected individual charges of plastic into the chambers 22, 22a, respectively. The adjustable stop bolts 28a, 28b pass freely through a crosshead 26a on the lower end of the piston rod 26 so that continued upward movement of one of the pistons, as for example 24a, responsive to pressure of the plastic entering the cylinder 22a, is permitted even though the stop bolt 28a has engaged the stop 28 to prevent further upward movement of the piston 24 when the desired charge has been supplied to the cylinder 22. Discharge of the measured charges from the cylinders 22 and 22a is effected by engagement and pressure exerted on the nuts 28c by the crosshead 26a when the piston rod 26 is forced downwardly by the motor 25.

Downward travel of the pistons 24 and 24a is limited by engagement with cylinder plugs 32 and 32a, respectively, which may be readily removed and the inner ends of which are located at the elevation of the inlet passages 20, 20a and discharge passages 33, 33a to and from the measuring chambers or cylinders 22 and 22a so that plastic is entirely discharged from the cylinders by the downstroke of the pistons 24 and 24a and the same plastic is not lodged or pocketed in the block 23 for more than one stroke of the pistons.

The two streams of plastic material discharged from the cylinders 22 and 22a through the passages 33 and 33a pass through valve passages 34 and 34a, respectively, of a valve 35 (Figs. 4 and 5) into a die-block portion 36 of the head H where they are reshaped from solid to tubular streams and discharged through their respective tubing nozzles or dies N¹ and N².

Figure 3:
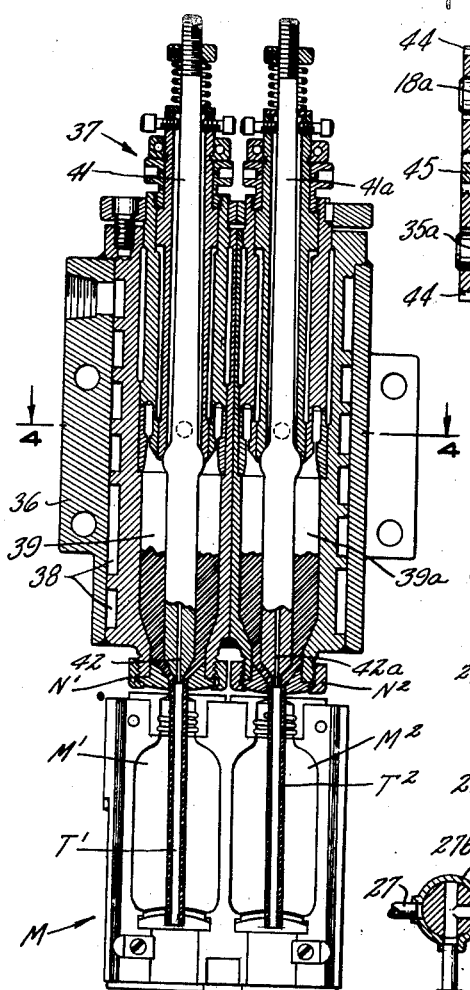
Fig. 3 is an enlarged cross-section of dual tube extruding nozzles and blow molds of the apparatus shown in Figs. 1 and 2.

As shown in Figs. 3 and 4, the die block 36 contains suitable tubing die components, generally designated 37, which may take numerous modified forms of which the illustrated form is merely one example. The details of the construction and adjustment of the die parts shown in Figs. 3 and 4 are generally similar to those of the tubing die described in detail in U. S. Patent 2,349,176 and need not be described in detail for a full understanding of the present invention.

Fluid medium may be circulated through passageways 38 to control the temperature of the plastic flowing through the two nozzle chambers 39 and 39a from their respective feed valve passages 34 and 34a and connecting die inlets 40 and 40a.

Tubing mandrels 41, 41a extend downwardly through their respective chambers 39, 39a, and into the nozzles N¹, N², so as to shape the plastic extruded therefrom by a dieing action into the tubing T¹, T².

Passages 42, 42a extend through the mandrels 41, 41a, respectively, and provide means for supplying blowing air or other high pressure inflating medium from a source (not shown) to the interior of the plastic tubes T¹, T², to blow mold the plastic material.

Figure 2:
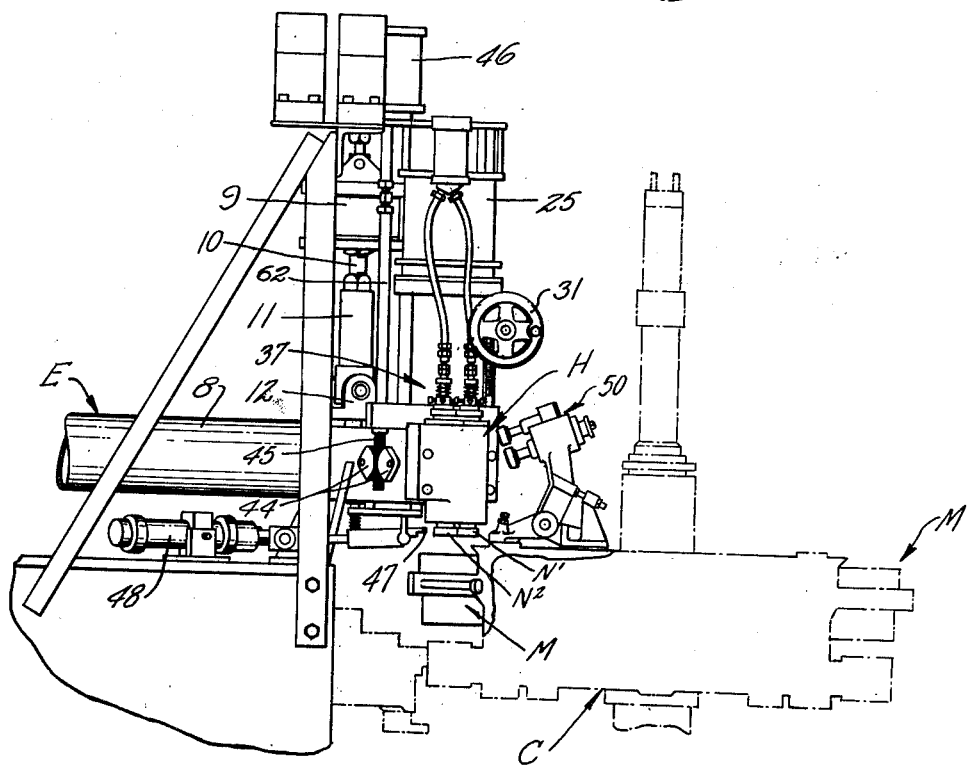
Fig. 2 is an elevational view of the portion of the apparatus shown in Fig. 1.

Actuation of the valves 18 and 35 to their opened and closed positions is effected in such a way that one valve is always closed when the other is opened. In the illustrated device, shafts 18a and 35a, respectively, of the valves 18 and 35 extend in parallel through bushings 43a in the block 23 and, as shown in Figs. 2 and 4, each is provided with a gear segment 44 which is keyed to its shaft. The two gear segments 44, 44 are rotated by common rack 45 which is reciprocated so as to oscillate the valves 18 and 35 through 90° and thereby alternately open and close the two valves 18 and 35 concurrently.

In the embodiment illustrated, the rack 45 is secured to the rod 62 which is reciprocated by operation of a cylinder motor 46 in response to the periodic supply of operating pressure fluid controlled by the timer shaft 14.

The plastic which issues as tube T¹ and T² from the nozzle N¹ and N² and is thereafter blow molded in the mold cavities M¹, M² may be severed by means of a knife 47 or otherwise separated from the plastic in the nozzles. The knife 47 may be operated by an air motor 48 controlled by the timer shaft to clean or shear off all the plastic left on the bottom of the nozzles N¹ and N² substantially as shown and described in the aforementioned Patent No. 2,349,176.

Thus, when the timer effects operation of the tilt cylinder 9 to raise the extruder E and head H, the motor 48 is actuated to advance the knife 47 across the bottom of the nozzle N¹, N², and when the extruder E is lowered, the motor 48 acts to retract the knife into the position in which it is shown in Fig. 2.

Figure 5:
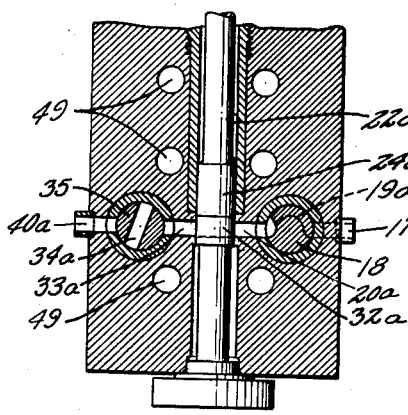
Fig. 5 is a cross-sectional view taken on line 5—5 of Fig. 4.

As heretofore explained, temperature controlling medium is caused to flow through various passages 38 within the die block 36 and similar passage in the extruding unit E to heat and maintain the temperature of the plastic. As shown in Figs. 4–6, similar passages 49 are provided in the head H to maintain the plastic at the desired temperature and viscosity throughout the extruding operation. It is preferred to use oil as the temperature controlling medium and a suitable source of oil and heating means therefor may be provided in the machine, although not illustrated in the drawings.

The blowing air or other suitable pressure fluid discharged into the tubes $T^1$ and $T^2$ through the under control of the timer may be supplied in various ways. It may, for example, be supplied as a low pressure puff which is trapped within the hollow plastic material or it may be admitted to the interior of the plastic material at high pressure and at a selected time cut off any air in the lines to the air tube vented to atmosphere. The supply of air here referred to is that which is supplied through the air tube into the interior of the plastic material prior to the time when the knife operates to sever the extruded material contained in the molds $M^1$ and $M^2$ from the parent material remaining in the extrusion nozzles $N^1$, $N^2$.

It will be understood that generally the molds M are in two or more sections which are closed at the extruding and blowing position and opened at or near their discharge or delivery position to which they are periodically moved by rotation of the carrier C.

The operation of the machine will be understood from the preceding description and from the following summary of operation.

The motor 2, Fig. 1, drives the mold carrier C and imparts a step-by-step movement to the carrier to bring the double mold cavities $M^1$, $M^2$, of the molds M successively into position beneath the nozzles $N^1$, $N^2$, respectively. The motor 2 also continuously drives the timer shaft 14 and timer (not shown). In addition, the motor 2 or other force means may drive the extruder E and operate a pump (not shown) which supplies pressure fluid under control of the timer to the several fluid motors 9, 25 and 46.

A complete machine cycle consists of four movements of mold carrier C, and for each movement of the carrier, the extruder E and associated parts go through a complete cycle of operations in cooperative relation to the dual cavities $M^1$, $M^2$ of one of the molds M on the carrier. Therefore, the timer shaft 14 turns four full revolutions for each complete revolution of the carrier C.

The various parts of the machine shown in Figs. 1–3 are in the positions which they occupy when the mold carrier is at rest with the dual cavities $M^1$, $M^2$ of a closed mold beneath and in axial alignment with the extrusion nozzles $N^1$, $N^2$ of the extrusion head H (see Figs. 1, 2 and 9) and another mold M open at the delivery position 52 for discharge of rigidified blown ware.

The mold M preferably is moved to this position and closed on the tubes $T^1$, $T^2$, although it will be understood that extrusion of the tube may be effected after the mold cavities $M^1$, $M^2$ are aligned with their nozzles and before the mold sections are closed.

The extruder E is pivoted on its trunnions (not shown) and the extrusion head H thereby lowered by relieving the pressure in the tilt cylinder line 13 whereupon the cylinder 46 is timer actuated to raise the rack 45 and rotate the valves 18 and 35 through approximately 90° from their positions shown in Figs. 5 and 6. Thereupon the valve 18 relieves the plastic material in the chambers 22 and 22a of the high pressure exerted by the extruder E and measured charges are swept from the chambers 22 and 22a by the pistons 24 and 24a responsive to the full pressure of line 27 exerted on the motor 25 and the charges are discharged in tubular shape as tubes $T^1$ and $T^2$ from the nozzles $N^1$, $N^2$. Thereupon, the mold cavities $M^1$, $M^2$ are closed on the plastic tubes suspended from the nozzles and air is introduced from the timer through the passages 42, 42a, to blow the plastic tubing into conformity with the mold cavities.

Thereafter the extruder E and head H are raised by actuation of the tilt cylinder motor 9 and the knife 47 is advanced by its operating cylinder 48 responsively to pressure medium supplied from the timer thereby severing the plastic along the bottom of the nozzles.

The blown articles may be rigidified while aligned with the nozzles. Preferably, however, the mold M is advanced by a 90° rotation of the carrier and the open mold M at station 52 (Fig. 1) from which the blown articles have been ejected moves into position beneath the extrusion nozzles before the last blown articles are rigidified. In the latter event, suitable means such as a secondary blow head 50 preferably is provided to keep the blown plastic articles inflated until the plastic is set or the top of the articles may be closed and the blowing pressure captured as described in Patent No. 2,349,177 prior to operation of the knife and relief of the blowing pressure in the passages 42, 42a.

Concurrently with the completion of the tube extrusion operation, the rack 45 is lowered so as to close the discharge valve 35 and open the intake valve 18. At the same time, the rod 62 actuates the valve lever 27d and thereby connects the line 27a with the check or safety valve 27c so that new charges of plastic are introduced by the extruder E into the cylinders 22 and 22a under a selected low back pressure preparatory to the next extrusion of tubes $T^1$, $T^2$.

When the following mold arrives beneath the extrusion head H, the head is lowered into the position shown in the drawings and the operational cycle repeated. If desired, the carrier C may be locked by any suitable locking mechanism generally designated L under the control of the timer while the extrusion and blowing operations are performed.

The invention is limited to use with organic plastic materials capable of being softened by heat and pressure and of being maintained at a low viscosity by transfer of heat thereto through metal walls without permanently or objectionably sticking to the metal surfaces in order to permit the material to be delivered in heat-softened workable condition, die shaped into a tubular preform, blow molded and rigidified. Various types of organic plastic materials meeting the above requirements may be formed into hollow articles of various shapes by the machine of this invention. Such materials may be supplied to the extruder in a solid state and it is intended that the plastic materials be so delivered to the machine although materials may be delivered to the extruder in pre-softened condition if desired.

The operation of the extruder E may be continuous or may be intermittently controlled by the timer and the extruder itself may be of the screw, ram or any type suitable for working and moving organic plastics.

While the illustrative embodiment concurrently die forms a plurality of tubes and simultaneously blow molds them, the invention also contemplates alternating the flow of plastics from the extruder through a plurality of nozzles and blow molding the thus formed tubes sequentially.

Various changes may be made in the details of construction and mode of operation of the illustrated embodiment of the invention without departing from the scope of the appended claims.

We claim:

1. Apparatus for forming blown hollow articles from organic plastic material including an extruder for plasticating and feeding said material under pressure as a confined flowing stream, operable first valve means for dividing and directing portions of said stream into individual measuring chambers, pressure applying means for exerting uniform back pressure on the material entering said chambers and for thereafter concurrently discharging measured charges from said chambers, a plurality of annular tube extrusion nozzles, operable second valve means for concurrently directing each measured charge to and through an individual nozzle to form a plurality of plastic tubes, a plurality of mold cavities operably alignable with the individual nozzles to receive said tubes, and means for introducing air into said tubes to expand and blow each of said tubes in its individual mold cavity.

2. Apparatus as recited in claim 1 and including means for closing each of said first and second valve means when the other of said first and second valve means is opened.

References Cited in the file of this patent

UNITED STATES PATENTS

| Number | Name | Date |
|---|---|---|
| 2,230,190 | Ferngren | Jan. 28, 1941 |
| 2,298,716 | Moreland et al. | Oct. 13, 1942 |
| 2,331,688 | Hobson | Oct. 12, 1943 |